United States Patent
Duval et al.

(10) Patent No.: US 12,175,314 B2
(45) Date of Patent: Dec. 24, 2024

(54) CONTACTLESS SYSTEM AND METHOD FOR REDUCING ELECTROMAGNETIC DISTURBANCES OF SAID CONTACTLESS SYSTEM

(71) Applicant: THALES DIS FRANCE SAS, Meudon (FR)

(72) Inventors: Benjamin Duval, Saint Maximin (FR); Olivier Fourquin, Fuveau (FR); Christophe Moreaux, Gardanne (FR); Laurent Fabre, Aix en Provence (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/029,804

(22) PCT Filed: Sep. 30, 2021

(86) PCT No.: PCT/EP2021/077029
§ 371 (c)(1),
(2) Date: Mar. 31, 2023

(87) PCT Pub. No.: WO2022/069679
PCT Pub. Date: Apr. 7, 2022

(65) Prior Publication Data
US 2024/0062032 A1  Feb. 22, 2024

(30) Foreign Application Priority Data
Oct. 1, 2020 (EP) .................................. 20315426

(51) Int. Cl.
*G06K 19/07* (2006.01)
(52) U.S. Cl.
CPC ..... *G06K 19/0723* (2013.01); *G06K 19/0709* (2013.01); *G06K 19/0715* (2013.01)

(58) Field of Classification Search
CPC .......... G06K 19/0723; G06K 19/0709; G06K 19/0715
See application file for complete search history.

(56) References Cited

U.S. PATENT DOCUMENTS 6,134,130 A  10/2000  Connell et al.
6,384,667 B1  5/2002  Bouvier
(Continued)

FOREIGN PATENT DOCUMENTS

EP  2235839 A2  10/2010

OTHER PUBLICATIONS

International Search Report (PCT/ISA/220) and Written Opinion (PCT/ISA/237) mailed on Jan. 17, 2022, by the European Patent Office as the International Searching Authority for current International Application No. PCT/EP2021/077029—[17 pages].

*Primary Examiner* — Sonji N Johnson

(57) ABSTRACT

Provided is a contactless electronic system configured for contactless communications with a reader over an electromagnetic field and comprising a power supply, a current monitor, a processing system comprising a hardware processor configured for performing operations, a dynamic extra current loader and a clock generator, wherein the power supply includes a clamp circuit, and wherein, continuously until the end of an execution phase of said hardware processor. The current monitor is configured for determining the maximal current Imax that can be provided by the power supply to the processing system from the electromagnetic field by comparing a current into the clamp circuit to at least one predetermined threshold. Other embodiments disclosed.

13 Claims, 7 Drawing Sheets

(56) References Cited

U.S. PATENT DOCUMENTS

| | | | |
|---|---|---|---|
| 10,572,789 B1* | 2/2020 | Stanford | G06K 19/0709 |
| 2012/0056718 A1 | 3/2012 | Leutgeb et al. | |
| 2012/0092901 A1* | 4/2012 | Wuidart | G06K 19/0701 |
| | | | 363/21.09 |

* cited by examiner

Fig. 4
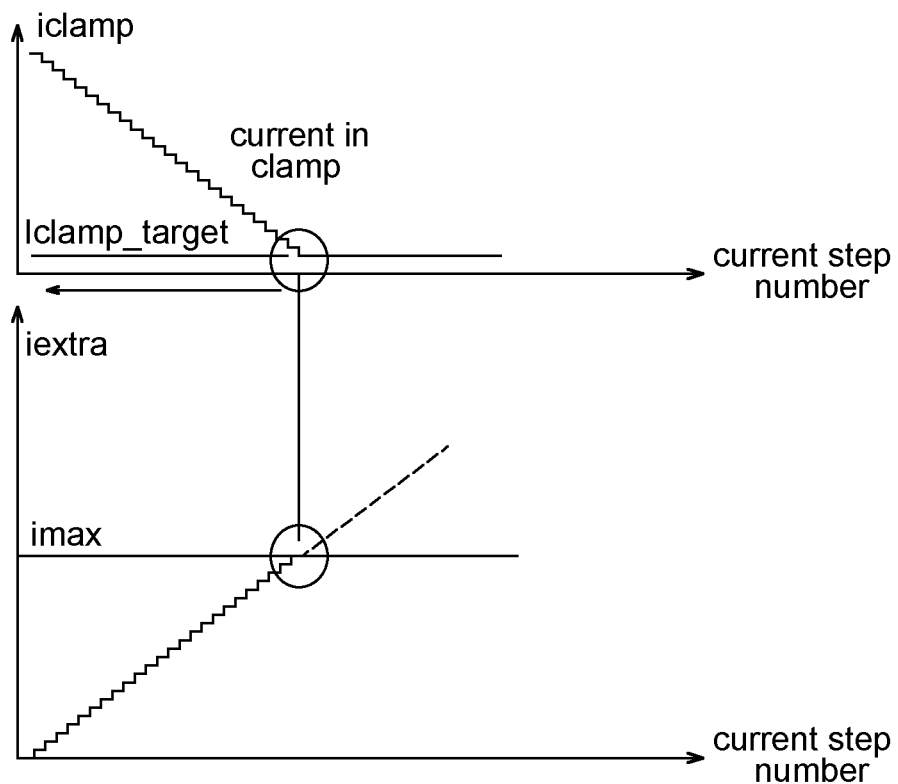
Fig. 5
| H   | Imax |
|-----|------|
| 1.5 | 2.6  |
| 2   | 3.8  |
| 3   | 6.2  |
| 4.5 | 9.8  |
| 7.5 | 10.5 |
| 10  | 10.5 |
Fig. 6
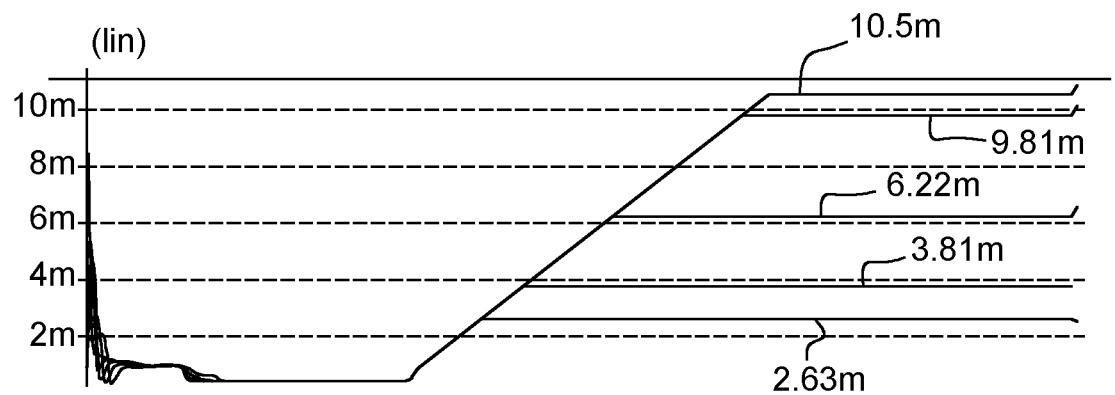

CONTACTLESS SYSTEM AND METHOD FOR REDUCING ELECTROMAGNETIC DISTURBANCES OF SAID CONTACTLESS SYSTEM

FIELD OF THE INVENTION

The present invention relates to the field of contactless communications, and more particularly to a contactless device and a corresponding method avoiding to create electromagnetic disturbances between the device and a reader during the operations of a processor of the device.

BACKGROUND OF THE INVENTION

As shown on FIG. 1, contactless devices such as RFID powered smartcards alternate phases of communication with a reader (RX and TX on FIG. 1) and phases of CPU computations (EXE on FIG. 1). The current consumption (Iplatform) of such a device during CPU computation may be very variable depending on CPU activity which may be more or less intensive. Such current variations during EXE phase may be misinterpreted by a reader as a communication attempt, at a time when the next communication phase of the device has not started yet. Such variations are called electromagnetic disturbances.

In addition, in the case of devices without internal power source such as RFID powered smartcards, the power that the device can draw from a contactless power source such as a smartcard reader depends on many parameters such as the distance between the power source and the device, the antenna size, the orientation between the reader's antenna and the device's antenna, the tank capacitor inside the device or the field strength. Some of those parameters may be considered as constant during CPU computation but other may vary. For example the distance and antenna orientation vary when the card holder is not perfectly steady or is approaching the card towards the power source. As a result the power available for the CPU is not constant and the CPU may have to adapt its computations in order to reduce its power consumption to avoid a power breakdown. Such variations of the power consumption of the device also contribute to the generation of electromagnetic disturbances.

Consequently, there is a need for a contactless device and an associated method that does not produce, during CPU computation phases, electromagnetic emissions that could interfere with RF communications between the contactless device and a RF reader, despite both variations of the power available to the CPU and variations of the consumption of the CPU.

SUMMARY OF THE INVENTION

For this purpose and according to a first aspect, this invention therefore relates to a contactless electronic system configured for contactless communications with a reader over an electromagnetic field and comprising a power supply, a current monitor, a processing system comprising a hardware processor configured for performing operations, a dynamic extra current loader and a clock generator, wherein the power supply includes a clamp circuit, and wherein, continuously until the end of an execution phase of said hardware processor:

said current monitor is configured for determining the maximal current Imax that can be provided by the power supply to the processing system from the electromagnetic field by comparing a current into the clamp circuit to at least one predetermined threshold, said current monitor is configured for comparing said determined maximal current Imax and a current drawn by the processing system Iplatform, said dynamic extra current loader is configured for loading an extra current Iextra equal to Imax−Iplatform when the current drawn by the processing system Iplatform is lower than the determined maximal current Imax Such a system enables to greatly reduce the electromagnetic disturbances caused by the system despite variations in the current consumption of the processing system and of the maximal power provided by the power supply.

In a first embodiment, the step of comparison of a current into the clamp circuit to at least one predetermined threshold may comprise:

comparing the current into the clamp to a Iclamp low threshold and a Iclamp high threshold, when the current into the clamp is higher than Iclamp high threshold, increasing the maximal current Imax until the current into the clamp reaches a target value Iclamp_target, when the current into the clamp is lower than Iclamp low threshold, decreasing the maximal current Imax until the current into the clamp reaches the target value Iclamp_target.

In a second embodiment, the step of comparison of a current into the clamp circuit to at least one predetermined threshold may comprise:

comparing the current into the clamp to a Iclamp low threshold and a Iclamp high threshold, when the current into the clamp is higher than Iclamp high threshold, increasing the maximal current Imax until the current into the clamp reaches Iclamp high threshold, when the current into the clamp is lower than Iclamp low threshold, decreasing the maximal current Imax until the current into the clamp reaches Iclamp low threshold.

Such embodiments enable to continuously adjust the maximal current Imax as soon as it increases or decreases more than margins represented by the high and low thresholds.

In a third embodiment, the step of comparison of a current into the clamp circuit to at least one predetermined threshold comprises:

comparing the current into the clamp to a target value Iclamp_target, when the current into the clamp is higher than the target value Iclamp_target, increasing the maximal current Imax until the current into the clamp reaches the target value Iclamp_target, when the current into the clamp is lower than the target value Iclamp_target, decreasing the maximal current Imax until the current into the clamp reaches the target value Iclamp_target.

Such an embodiment enables to continuously adjust the maximal current Imax with an accuracy equal to the Iclamp target value.

In a fourth embodiment, the step of comparison of a current into the clamp circuit to at least one predetermined threshold comprises:

comparing the current into the clamp to a Iclamp low threshold, when the current into the clamp is lower than Iclamp low threshold, resetting the maximal current Imax to zero and increasing it until the current into the clamp reaches a target value Iclamp_target.

Such an embodiment enables to cut instantly the system current consumption when the available current decreases, by forcing Imax to '0'. Therefore, it prevents a system collapse more efficiently than other solutions which progressively decrease or increase the maximal current Imax.

A benefit to know the maximal available current is that said hardware processor, may be configured for preventively reducing its power consumption depending on said determined maximal current Imax in order to prevent a collapse of the power supply.

According to a second aspect, this invention relates to a method for reducing the electromagnetic disturbances of a contactless electronic system configured for contactless communications with a reader over an electromagnetic field and comprising a power supply, a current monitor, a processing system comprising a hardware processor configured for performing operations, a dynamic extra current loader and a clock generator, wherein the power supply includes a clamp circuit, and comprising, performed continuously by said contactless electronic system until the end of an execution phase of said hardware processor:
  determining the maximal current Imax provided by the power supply to the processing system from the electromagnetic field by comparing a current into the clamp circuit to at least one predetermined threshold, by said current monitor,
  comparing said determined maximal current Imax and a current drawn by the processing system Iplatform by said current monitor,
  when the current drawn by the processing system Iplatform is lower than the determined maximal current Imax, loading an extra current Iextra equal to Imax−Iplatform by said dynamic extra current loader.

In a first embodiment, the step of comparing a current into the clamp circuit to at least one predetermined threshold of the method according to the second aspect may comprise:
  comparing the current into the clamp to a Iclamp low threshold and a Iclamp high threshold,
  when the current into the clamp is higher than Iclamp high threshold, increasing the maximal current Imax until the current into the clamp reaches a target value Iclamp_target,
  when the current into the clamp is lower than Iclamp low threshold, decreasing the maximal current Imax until the current into the clamp reaches the target value Iclamp_target.

In a second embodiment, the step of comparing a current into the clamp circuit to at least one predetermined threshold of the method according to the second aspect may comprise:
  comparing the current into the clamp to a Iclamp low threshold and a Iclamp high threshold,
  when the current into the clamp is higher than Iclamp high threshold, increasing the maximal current Imax until the current into the clamp reaches Iclamp high threshold,
  when the current into the clamp is lower than Iclamp low threshold, decreasing the maximal current Imax until the current into the clamp reaches Iclamp low threshold.

In a third embodiment, the step of comparing a current into the clamp circuit to at least one predetermined threshold of the method according to the second aspect may comprise:
  comparing the current into the clamp to a target value Iclamp_target,
  when the current into the clamp is higher than the target value Iclamp_target, increasing the maximal current Imax until the current into the clamp reaches the target value Iclamp_target,
  when the current into the clamp is lower than the target value Iclamp_target, decreasing the maximal current Imax until the current into the clamp reaches the target value Iclamp_target.

In a fourth embodiment, the step of comparing a current into the clamp circuit to at least one predetermined threshold of the method according to the second aspect may comprise:
  comparing the current into the clamp to a Iclamp low threshold,
  when the current into the clamp is lower than Iclamp low threshold, resetting the maximal current Imax to zero and increasing it until the current into the clamp reaches a target value Iclamp_target.

The method according to the second aspect may comprise: reducing, by said hardware processor, its power consumption depending on said determined maximal current Imax, in order to prevent a collapse of the power supply.

Such a method has the same advantages as the electronic system described above.

According to a third aspect, this invention relates to a computer program product directly loadable into the memory of at least one computer, comprising software code instructions for performing the steps of the method according to the second aspect of the invention when said product is run on the computer.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

FIG. 4 is a schematic illustration of an embodiment for determining the maximal current;

FIG. 5 gives examples of values of the maximal current Imax determined for different strength of the electromagnetic field H;

FIG. 6 gives examples of the variation of the extra current Iextra for the different field strength of FIG. 5;

DETAILED DESCRIPTION OF EMBODIMENTS OF THE INVENTION

According to a first aspect, the invention relates to a contactless electronic system configured for contactless communications with a reader over an electromagnetic field. Such a contactless electronic system may for example be an electronic identity document such as a passport, or a smartcard such as a payment card.

Figure 1:
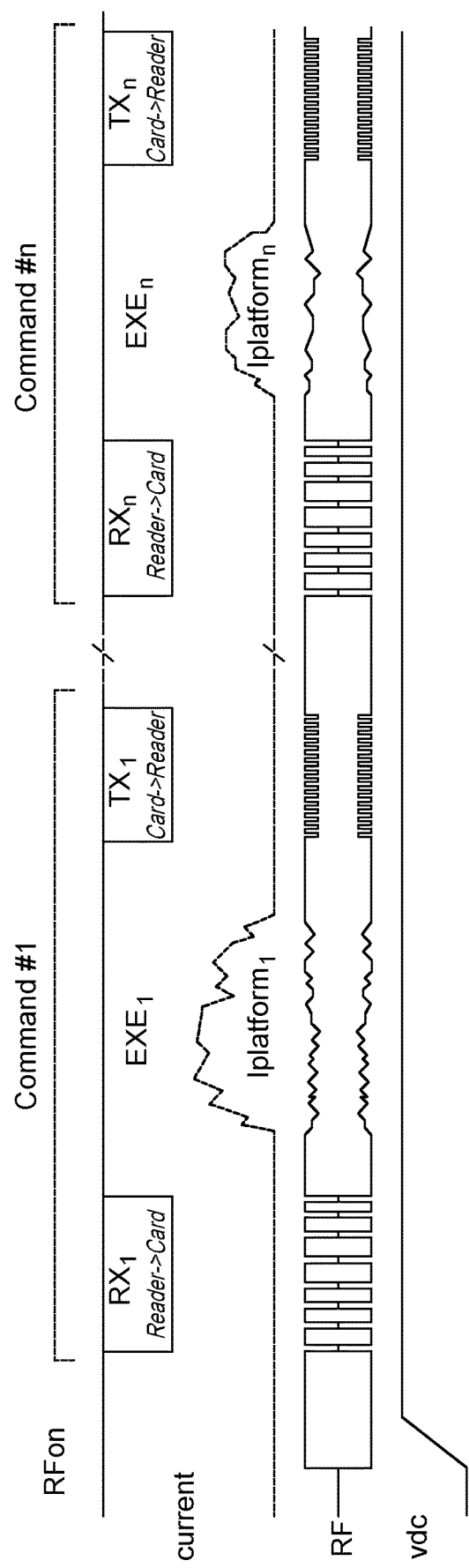
FIG. 1 is a schematic illustration of communication phases and of CPU computations of a contactless system according to the prior art.
Figure 2:
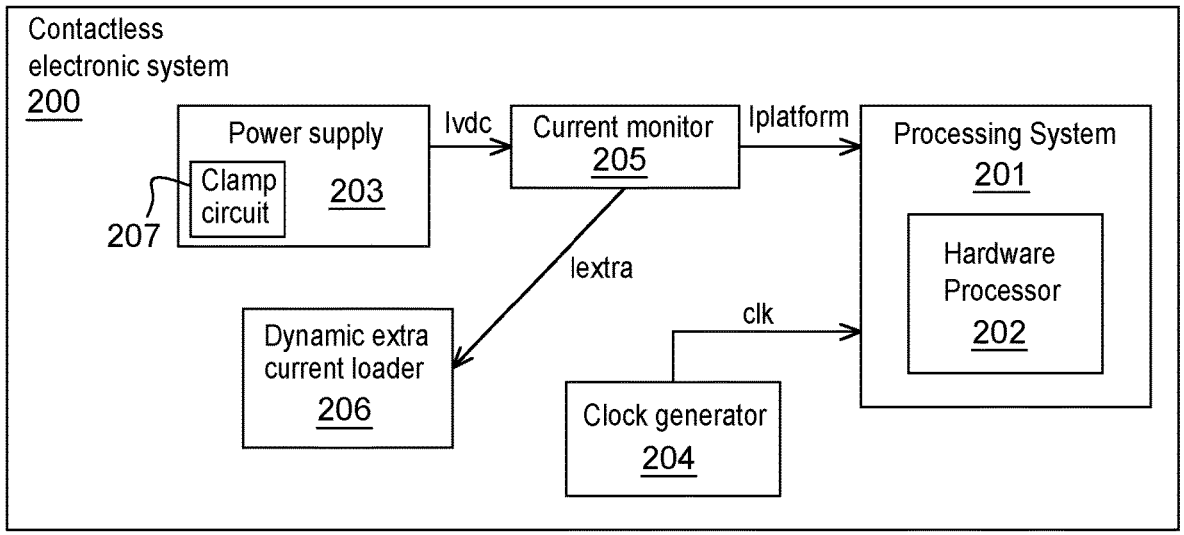
FIG. 2 is a schematic illustration of a contactless electronic system according to an embodiment of the present invention.

As shown on FIG. 2, the contactless electronic system 200 comprises a processing system 201 comprising a hardware processor 202 configured for performing operations, and a power supply 203 harvesting energy from the electromagnetic field provided by the reader, and providing power to the processing system, and a clock generator 204 providing a clock signal to the processing system. The processing system may include additional components of a usual digital system such as one or more memories, buses, input/output interfaces . . . .

In order to avoid the execution of operations by the processor causing electromagnetic disturbance with the reader, the main idea of the invention is to make the total current consumption of the contactless electronic system almost constant during the execution phases of the processor. In order to do so, as shown on FIG. 2, the contactless electronic system 200 also comprises a current monitor 205 and a dynamic extra current loader 206.

Such a current monitor may be used to determine the maximal current that can be provided by the power supply to the processing system from the electromagnetic field; and then to monitor the current really drawn by the processing system in comparison to this maximal current.

The dynamic extra current loader may be used to draw an extra current from the power supply in addition to the current drawn by the processing system, in order to make the total current drawn from the power supply constant, whatever the operations executed by the processor and whatever their power consumption.

Nevertheless, the maximal current that can be provided by the power supply to the processing system from the electromagnetic field may vary during the execution of operations by the processor depending on various parameters such as the distance or orientation between the antenna of the source of the electromagnetic field and the antenna of contactless electronic system. In order to take it into account, the maximal current Imax is continuously reevaluated and the extra current Iextra continuously adjusted until the end of the execution phase of the hardware processor.

Figure 3:
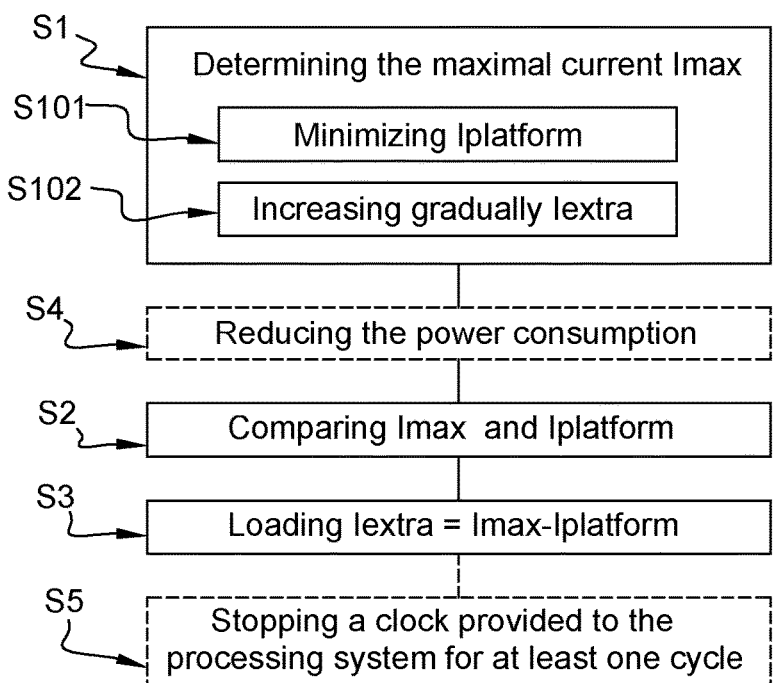
FIG. 3 is a schematic illustration of a method for reducing the electromagnetic disturbances of a contactless electronic system according to an embodiment of the present invention.

The following paragraphs describe with more details the steps of a method according to a second aspect of the invention for reducing the electromagnetic disturbances of a contactless electronic system, as shown on FIG. 3. These steps are continuously performed until the end of the execution phase of the hardware processor.

In a first step S1, the current monitor determines the maximal current Imax provided by the power supply to the processing system from the electromagnetic field.

In order to measure the maximal current Imax, the power supply includes a clamp circuit 207. The determination of the maximal current Imax is performed by comparing a current flowing into the clamp circuit to at least one predetermined threshold. An initial determination of the maximal current Imax is first performed.

In a first measurement step S101, the processing system may put itself in a quiescent mode in order to minimize its power consumption. The power supply then provides a minimal current to the processing system, and all the rest to the clamp circuit. In order to minimize the current drawn by the processing system, it may be turned off. Then, as shown on FIG. 4, during a second measurement step S102, the electronic system may gradually increase the extra current Iextra, which makes the current through the clamp circuit Iclamp decrease until it gets equal to a predetermined value, called Iclamp_target on FIG. 4. This predetermined value may be equal to zero or may be equal to a minimal current margin that may be drawn by the processing system without risk of collapsing the power supply until the extra current loaded is reevaluated. The maximal current Imax that can be provided to the processing system is the value of the extra current at that time.

Such a measurement of the maximal current Imax may be performed at the beginning of an execution phase of the hardware processor or earlier, for example during a startup phase of the electronic system.

In some cases, the field of the reader may be strong enough to provide to the electronic system more power than its maximum power consumption. In such a case, at some point during the second measurement step S102 the extra current Iextra will exceed a predefined maximal possible current consumption of the processing system while some current is still flowing through the clamp circuit. In such a case the second measurement step may come to an end and the maximal current Imax may be set to a predefined value greater than the predefined maximal possible current consumption of the processing system even if the actual maximal current that may be drawn from the electromagnetic field has not been measured.

The table of FIG. 5 gives values of the maximal current Imax determined for different strength of the electromagnetic field H. For the two last values of the table, the field is strong enough to provide enough energy to the electronic system whatever the activity of the processor and the maximal current Imax is set to the predefined value 10.5 mA. The variation of the extra current Iextra during this first step for the different field strength of FIG. 5 is shown on FIG. 6. The extra current Iextra gradually increases until it reaches the value of Imax shown on FIG. 5 corresponding to the field strength at the time the measurement is performed.

At the end of the initial determination of the maximal current Imax, the processing system may be turned on again if it had been turned off.

In a second step S2, the current monitor compares the determined maximal current Imax and the current actually drawn by the processing system, called Iplatform, as shown on FIG. 2.

The dynamic extra current loader may then perform an action depending on the result of the comparison between Imax and Iplatform.

In a third step S3, when the current drawn by the processing system Iplatform is lower than the determined maximal available current Imax, the dynamic extra current loader loads an extra current Iextra equal to Imax−Iplatform. In order to do so, the current monitor may either compute Iextra and provide it to the dynamic extra current loader, or the current monitor may provide both Imax and Iplatform to the dynamic extra current loader and let it determine Iextra.

Such a comparison by said current monitor between the determined maximal current Imax and the current drawn by the processing system Iplatform, and such a loading by the dynamic extra current loader of said extra current Iextra may be performed continuously until the end of the execution phase. By doing so, the total current consumption of the electronic system may be kept equal to the maximal current along all the execution phase of the processor. Therefore the total current consumption of the electronic system is kept constant as long as the maximal current Imax stays constant.

Figure 9:
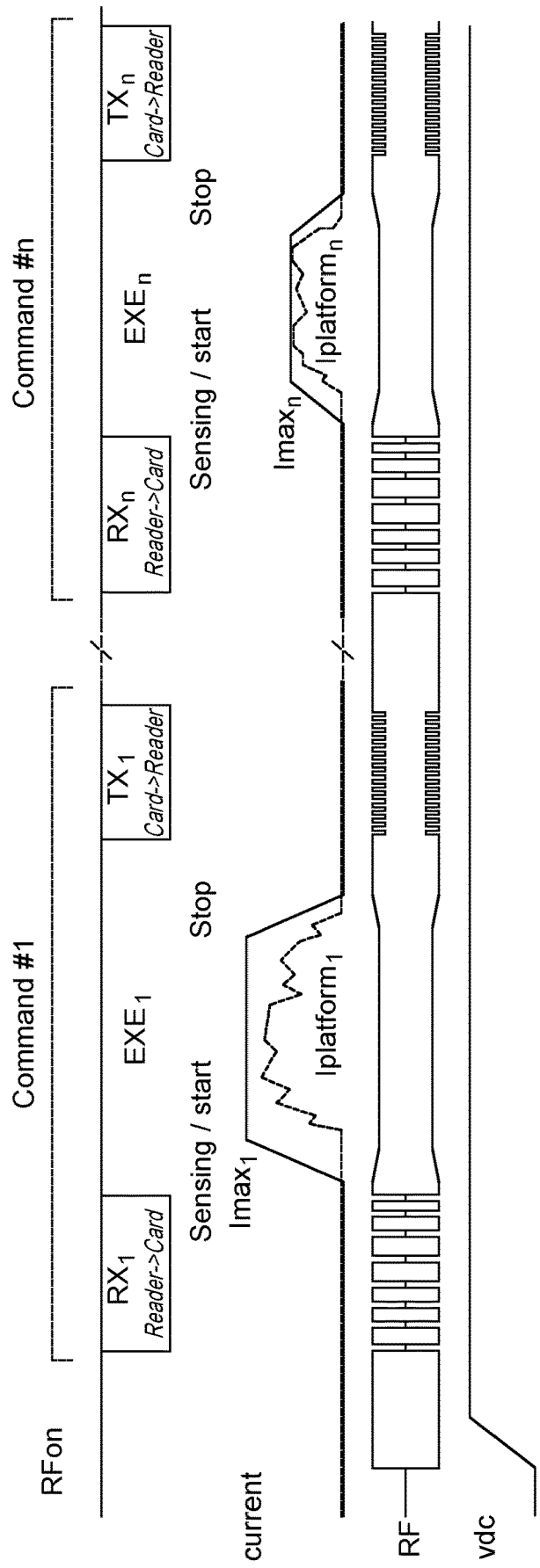
FIG. 9 gives examples of resulting current consumption during an execution phase of the processor according to the present invention.

The resulting current consumption during an execution phase of the processor with a constant maximal current Imax is shown on FIG. 9. During most of the execution phase, the current consumption is equal to Imax, whatever the value of the current consumption of the processor, noted Iplatform. As a result, the electromagnetic emissions of the processor during such an execution phase are almost constant, which greatly reduces the electromagnetic disturbances to the communication with the reader.

At the end of the execution phase, the processing system may be turned off again and all the current drawn from the field may flow through the clamp circuit.

Since the current drawn by the processing system and the maximal current provided by the power supply are known, the system may also be configured to prevent the processing system from drawing too much current and causing a power supply collapse.

In order to do so, in a fourth step S4, the hardware processor may reduce its power consumption depending on said determined maximal current Imax, in order to prevent a collapse of the power supply that could occur when the current drawn by the processing system Iplatform is higher than the determined maximal current Imax that can be provided. In order to reduce its power consumption, the hardware processor may for example go into an energy saving mode resulting in a reduction of its operating voltage, a reduction of its operating frequency or a deactivation of some of its internal blocks, such as its processing units in the case of a processor with multiple execution cores. In order to be aware of its overconsumption, the processor may get the value of Imax from the current monitor and may monitor its own power consumption. Alternatively it may be warned by a message or by values of Imax and Iplatform or Iextra transmitted by the current monitor or by the dynamic extra current loader.

In addition, when the current drawn by the processing system Iplatform is higher than the determined maximal current Imax that can be provided to the processing system, in a fifth step S5, the clock generator may stop the clock it provides to the processing system for at least one cycle in order to prevent a collapse of the power supply. Doing so will slow down the processor and eventually reduce its current consumption Iplatform. The clock generator may be instructed to do so by the current monitor or by the dynamic extra current loader.

The fourth and fifth steps are two different ways of preventing a collapse of the power supply. They may be performed concurrently.

Figure 10:
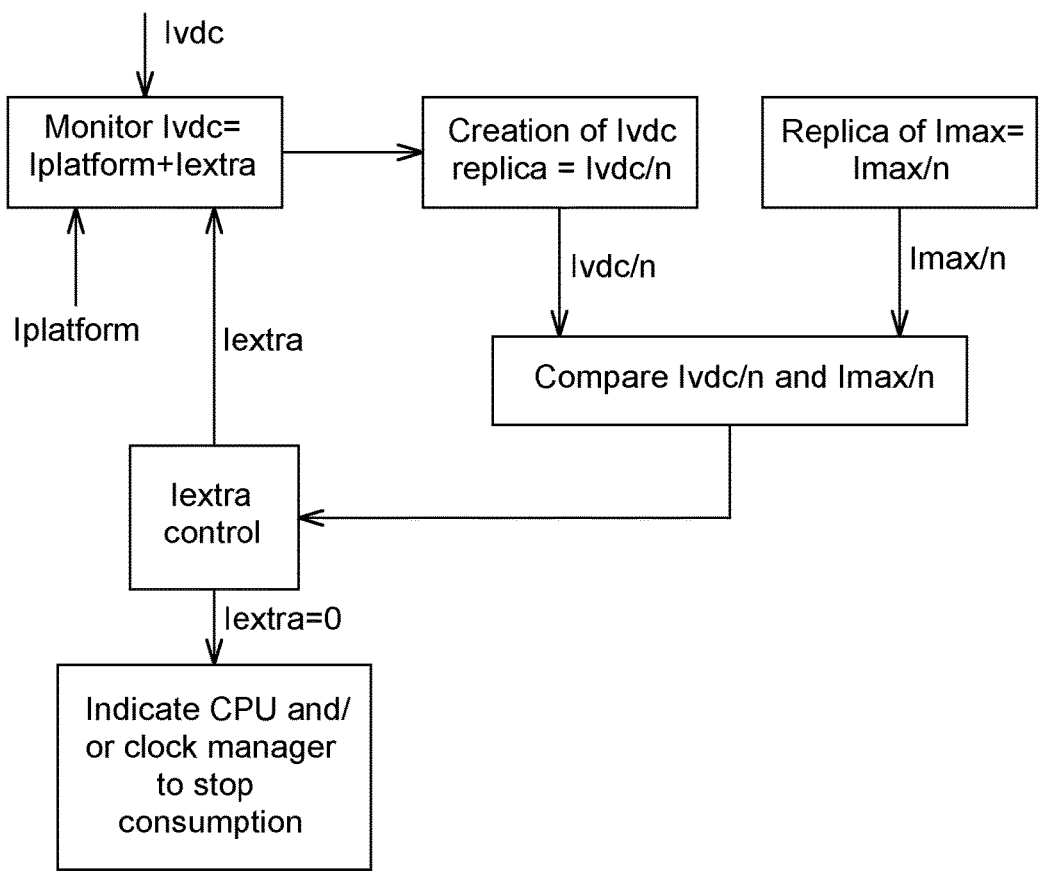
FIGS. 10 and 11 are schematic illustrations of an architecture of the current monitor for performing the current monitoring according to the present invention.
Figure 11:
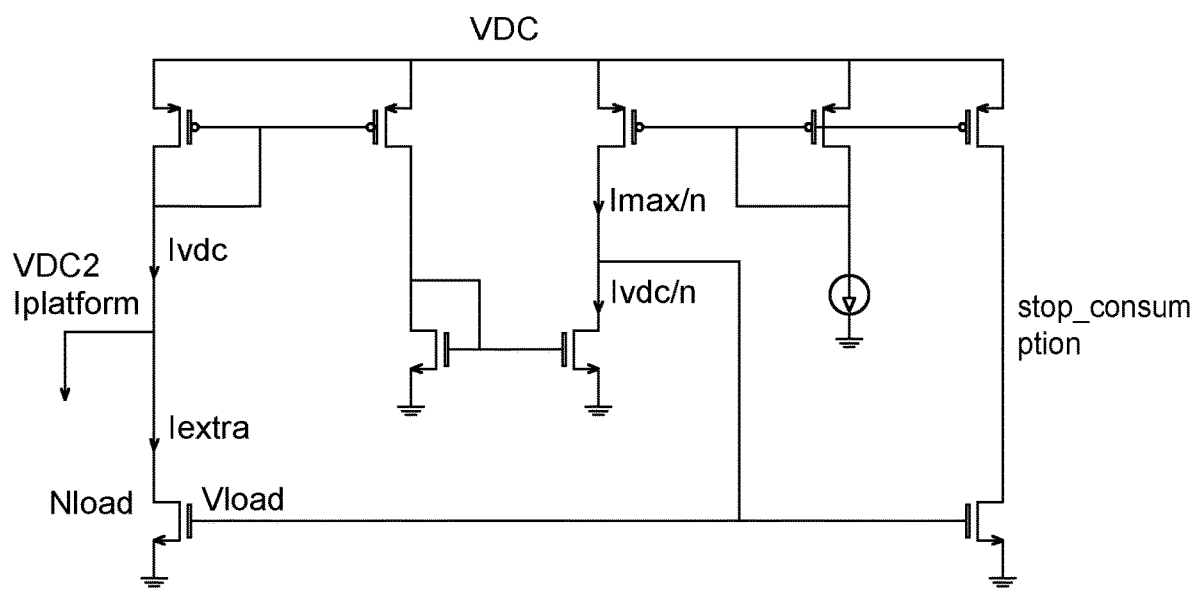

An example of architecture of the current monitor for performing such a current monitoring is shown FIGS. 10 and 11. Such an architecture creates a signal Ivdc=Iplatform+Iextra and includes a regulation loop of the extra current Iextra which increases Iextra when Ivdc<Imax and decreases Iextra when Ivdc>Imax. Instead of working directly on Ivdc and Imax values, the current monitor may generate replicas of lower intensity Ivdc/n and Imax/n with n a predefined value.

Figure 12:
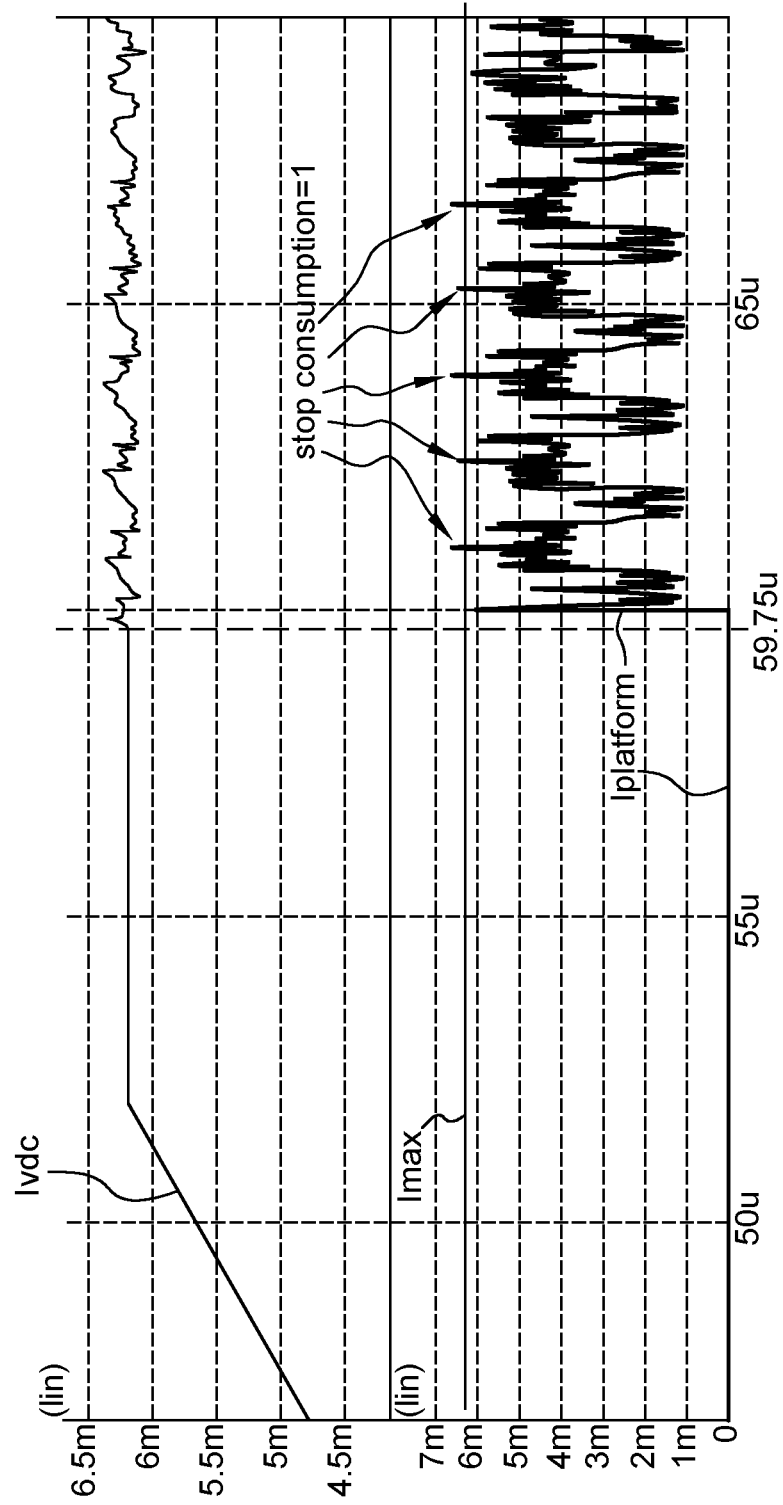
FIG. 12 shows an example of variations of Ivdc and Iplatform during an execution phase of the processing system.

FIG. 12 shows an example of variations of Ivdc and Iplatform during an execution phase of the processing system. In this example, Imax is constant and set to 6.2 mA. During the first step, Iplatform is very low and Iextra is gradually increased until Ivdc reaches Imax. Then during the second step, Iplatform varies between 1 mA and 6 mA, but Iextra is continuously adapted which enables to keep Ivdc almost constant. The small variations of Ivdc generate much less electromagnetic disturbance than Iplatform variations would if it no extra current was loaded. On this Figure, Iplatform slightly goes above Imax five times. Each time, the clock generator stopped the clock provided to the processor, which effectively prevented any further increase of Iplatform and Ivdc and any collapse of the power supply.

The paragraphs above described an initial determination of the maximal current Imax during the first measurement step S101 and then, in subsequent steps, how the information of the maximal current Imax may be used to keep constant the total current consumption of the electronic system and to prevent a power supply collapse by a processor overconsumption.

Nevertheless, the maximal current Imax may vary during the execution of operations by the processor depending on various parameters such as the distance or orientation between the antenna of the source of the electromagnetic field, such as a reader, and the antenna of contactless electronic system. In order to take it into account, the maximal current Imax shall be continuously reevaluated and the extra current Iextra continuously adjusted until the end of the execution phase of the hardware processor. Therefore, after the initial determination of the maximal current Imax, the current monitor, during the first step of the invention which is continuously performed reevaluates the maximal current Imax until the end of the execution phase of the hardware processor. Indeed, the power provided by field may increase, for example if the electronic system gets closer to the reader. In that case, it shall be taken into account by increasing the maximal current Imax so that the processing system can take advantage of this extra power and perform computations without unnecessarily slowing it down in order to limit its power consumption. On the other hand, the available power may decrease, for example if the distance between the reader and the electric system increases. In such a case, if the total current drawn by the processing system and the extra current loader remains equal to the previously determined value of the maximal current Imax, there is a high risk that the power supply collapses.

In a first embodiment, in order to reevaluate the maximal current Imax by comparing a current into the clamp circuit to at least one predetermined threshold, the current monitor may compare the current into the clamp to a Iclamp low threshold and a Iclamp high threshold, and:
  when the current into the clamp is higher than Iclamp high threshold, it may increase the maximal current Imax until the current into the clamp reaches a target value Iclamp_target,
  when the current into the clamp is lower than Iclamp low threshold, it may decrease the maximal current Imax until the current into the clamp reaches the target value Iclamp_target.

The target value Iclamp_target for the current in the clamp may be the same as the predetermined value used as a target for the current in the clamp during the initial determination of the maximal current.

By doing so, the current in the clamp is brought back to its target value Iclamp_target as soon as it goes out of the interval [Iclamp low threshold; Iclamp high threshold].

Figure 7:
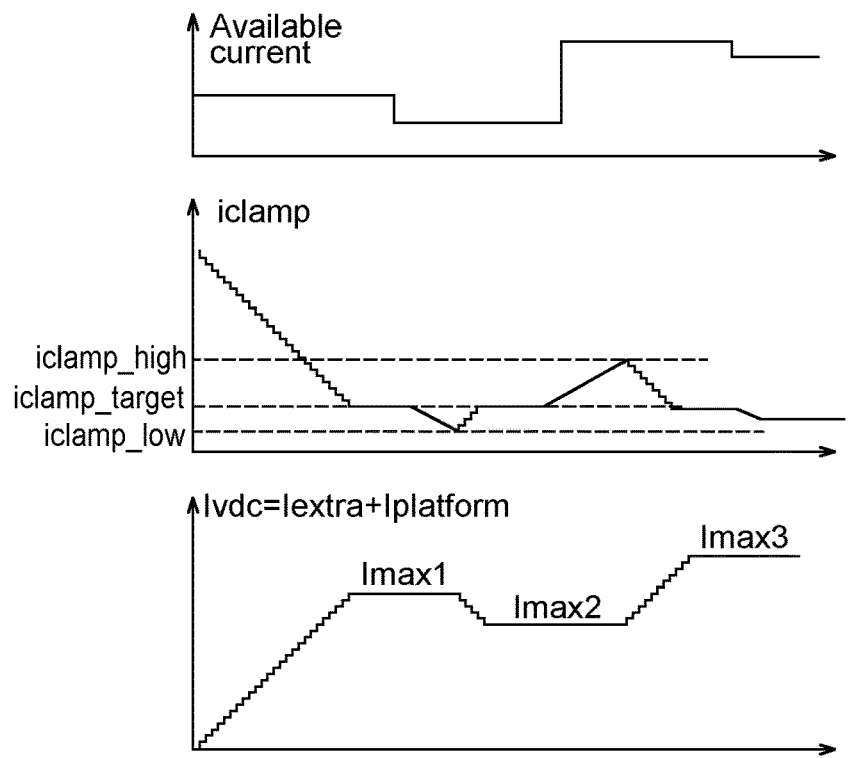
FIG. 7 gives examples for reevaluating the maximal current Imax by comparing a current into the clamp circuit to at least one predetermined threshold.

An example of such an embodiment is given on FIG. 7. In this example, after the initial determination of the maximal current Imax, it is set to Imax1 when the current in the clamp Iclamp reaches the target value Iclamp_target. Then, the available power decreases which makes Iclamp decrease as well and reach the low threshold Iclamp_low. From this moment, Imax is gradually decreased until Iclamp comes back to its target value Iclamp_target. At this point Imax is equal to Imax2. Then the available power increases which makes Iclamp increase as well and reach the high threshold Iclamp_high. From this moment, Imax is gradually increased until Iclamp comes back to its target value Iclamp_target. At this point Imax is equal to Imax3. Then Iclamp slightly decreases but it stays in the interval [Iclamp low threshold; Iclamp high threshold]. As a result, Imax is not reevaluated and remains equal to Imax3.

In a second embodiment, in order to reevaluate the maximal current Imax by comparing a current into the clamp circuit to at least one predetermined threshold, the current monitor may compare the current into the clamp to a Iclamp low threshold and a Iclamp high threshold, and:
  when the current into the clamp is higher than Iclamp high threshold, it may increase the maximal current Imax until the current into the clamp reaches Iclamp high threshold,
  when the current into the clamp is lower than Iclamp low threshold, it may decrease the maximal current Imax until the current into the clamp reaches Iclamp low threshold. This embodiment is very similar to the first embodiment, except that there is no more a target for Iclamp. Instead Iclamp is just kept in the interval [Iclamp low threshold; Iclamp high threshold].

In a third embodiment, in order to reevaluate the maximal current Imax by comparing a current into the clamp circuit to at least one predetermined threshold, the current monitor may compare the current into the clamp to a target value Iclamp_target, and:
  when the current into the clamp is higher than the target value Iclamp_target, it may increase the maximal current Imax until the current into the clamp reaches the target value Iclamp_target,
  when the current into the clamp is lower than the target value Iclamp_target, it may decrease the maximal current Imax until the current into the clamp reaches the target value Iclamp_target.

Figure 8:
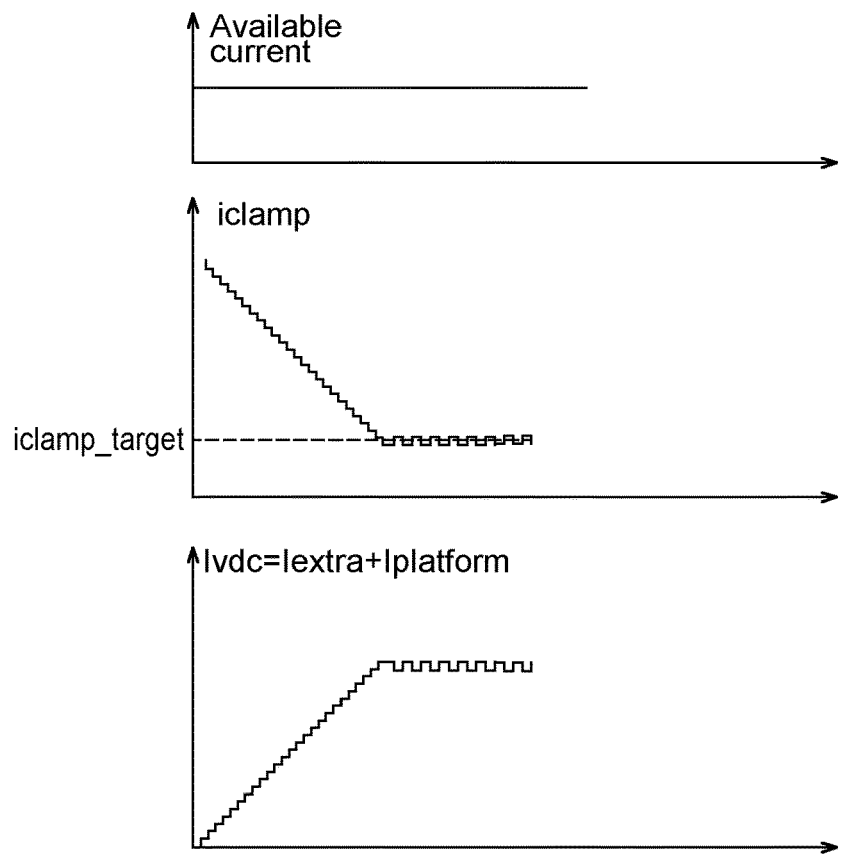
FIG. 8 gives another examples for reevaluating the maximal current Imax by comparing a current into the clamp circuit to at least one predetermined threshold.

By doing so, Iclamp continuously oscillates around the target value. Such an embodiment is depicted on FIG. 8 in which Iclamp oscillates around the target value, which is called here Iclamp_target, eventhough the available power remains constant.

In a fourth embodiment, in order to reevaluate the maximal current Imax by comparing a current into the clamp circuit to at least one predetermined threshold, the current monitor may compare the current into the clamp to a Iclamp low threshold and:
  when the current into the clamp is lower than Iclamp low threshold, it may reset the maximal current Imax to zero and increase it until the current into the clamp reaches a target value Iclamp_target.

Basically, in this embodiment, the initial determination process is performed again when the current into the clamp becomes lower than Iclamp low threshold, such that it is set back to its target value Iclamp_target.

By continuously reevaluating the maximal current Imax, the value of the maximal current Imax is kept accurate all along the execution phase. The frequency at which the maximal current is reevaluated and the size of the increase and decrease steps of the maximal current may be optimized in order to find a balance between an accurate measurement of the maximal current and the cost and speed of this measurement In case of variations of the maximal current Imax during an execution phase, an example of resulting current consumption is given on the third graph of the FIG. 7. Even though the total current consumption is not fully constant during the whole execution phase, it is constant most of the time and variations are slower and occur much less frequently than current consumption variations usually caused by varying computing operations, which also greatly reduces the electromagnetic emissions and the electromagnetic disturbances to the communication with the reader.

According to a third aspect, the invention relates to a computer program product directly loadable into the memory of at least one computer, comprising software code instructions for performing, when said product is run on the computer, the steps of the method described here before.

In addition to these features, the method and the computer program according to the second and third aspects of the invention may be configured for performing or may comprise any other features described here before.

The invention claimed is:

1. A contactless electronic system configured for alternating phases of contactless communications with a reader over an electromagnetic field field and processor execution phases and comprising a power supply, a current monitor, a processing system comprising a hardware processor configured for performing operations, a dynamic extra current loader and a clock generator, wherein the power supply includes a clamp circuit, and wherein, continuously until an end of each execution phase of said hardware processor:
  said current monitor is configured for continuously reevaluating during the execution phase of the processor the maximal current Imax that can be provided by the power supply to the processing system from the electromagnetic field by comparing a current into the clamp circuit to at least one predetermined threshold,
  said current monitor is configured for comparing said determined maximal current Imax and a current drawn by the processing system, referred to as, Iplatform,
  said dynamic extra current loader is configured for drawing from the power supply in addition to the current drawn by the processing system, Iplatform, an extra current, referred to as, Iextra equal to a subtraction operation (Imax−Iplatform), when the current drawn by the processing system Iplatform is lower than the determined maximal current, referred to as, Imax,
  wherein said dynamic extra current loader is an extra current from the power supply in addition to the current drawn by the processing system.

2. The contactless electronic system of claim 1, wherein, continuously reevaluating the maximal current, Imax, comprises:
  comparing the current into the clamp, referred to as Iclamp, to a Iclamp low threshold and a Iclamp high threshold,
  when the current into the clamp is higher than Iclamp high threshold, increasing the maximal current, referred to as, Imax until the current into the clamp reaches a target value, referred to as, Iclamp_target, when the current into the clamp is lower than Iclamp low threshold, decreasing the maximal current Imax until the current into the clamp reaches the target value Iclamp_target.

3. The contactless electronic system of claim 1, wherein, continuously reevaluating the maximal current, Imax, comprises:
comparing the current into the clamp, referred to as Iclamp, to a Iclamp low threshold and a Iclamp high threshold,
when the current into the clamp is higher than Iclamp high threshold, increasing the maximal current Imax until the current into the clamp reaches Iclamp high threshold,
when the current into the clamp is lower than Iclamp low threshold, decreasing the maximal current Imax until the current into the clamp reaches Iclamp low threshold.

4. The contactless electronic system of claim 1, wherein, continuously reevaluating the maximal current, Imax, comprises:
comparing the current into the clamp to a target value, referred to as, Iclamp_target,
when the current into the clamp is higher than the target value Iclamp_target, increasing the maximal current Imax until the current into the clamp reaches the target value Iclamp_target,
when the current into the clamp is lower than the target value Iclamp_target, decreasing the maximal current Imax until the current into the clamp reaches the target value Iclamp_target.

5. The contactless electronic system of claim 1, wherein, continuously reevaluating the maximal current, Imax, comprises:
comparing the current into the clamp, referred to as Iclamp, to a Iclamp low threshold,
when the current into the clamp is lower than Iclamp low threshold, resetting the maximal current Imax to zero and increasing it until the current into the clamp reaches a target value, referred to as, Iclamp_target.

6. The contactless electronic system according to claim 5, wherein, said hardware processor, is configured for reducing its power consumption depending on said determined maximal current, referred to as, Imax, in order to prevent a collapse of the power supply.

7. A method for reducing the electromagnetic disturbances of a contactless electronic system configured for alternating phases of contactless communications with a reader over an electromagnetic field and processor execution and comprising a power supply, a current monitor, a processing system comprising a hardware processor configured for performing operations, a dynamic extra current loader and a clock generator wherein the power supply includes a clamp circuit, and comprising, performed continuously by said contactless electronic system until an end of each execution phase of said hardware processor:
continuously reevaluating during the execution phase of the processor a maximal current, referred to as, Imax provided by the power supply to the processing system from the electromagnetic field by comparing a current into the clamp circuit to at least one predetermined threshold, by said current monitor,
comparing said maximal current Imax determined and a current drawn by the processing system, referred to as, Iplatform by said current monitor,
when the current drawn by the processing system Iplatform is lower than the determined maximal current Imax, drawing from the power supply in addition to the current drawn by the processing system, Iplatform an extra current, referred to as, Iextra equal to a subtraction operation (Imax−Iplatform), by said dynamic extra current loader,
wherein said dynamic extra current loader is an extra current from the power supply in addition to the current drawn by the processing system.

8. The method of claim 7 wherein continuously reevaluating the maximal current, Imax, comprises:
comparing the current into the clamp, referred to as Iclamp, to a Iclamp low threshold and a Iclamp high threshold,
when the current into the clamp is higher than Iclamp high threshold, increasing the maximal current Imax until the current into the clamp reaches a target value, referred to as, Iclamp_target,
when the current into the clamp is lower than Iclamp low threshold, decreasing the maximal current, referred to as, Imax until the current into the clamp reaches the target value Iclamp_target.

9. The method of claim 7 wherein continuously reevaluating the maximal current, Imax, comprises:
comparing the current into the clamp, referred to as Iclamp, to a Iclamp low threshold and a Iclamp high threshold,
when the current into the clamp is higher than Iclamp high threshold, increasing the maximal current, referred to as, Imax until the current into the clamp reaches Iclamp high threshold,
when the current into the clamp is lower than Iclamp low threshold, decreasing the maximal current Imax until the current into the clamp reaches Iclamp low threshold.

10. The method of claim 7 wherein continuously reevaluating the maximal current, Imax, comprises:
comparing the current into the clamp, referred to as Iclamp, to a target value, referred to as, Iclamp_target,
when the current into the clamp is higher than the target value Iclamp_target, increasing the maximal current, referred to as, Imax until the current into the clamp reaches the target value Iclamp_target,
when the current into the clamp is lower than the target value Iclamp_target, decreasing the maximal current Imax until the current into the clamp reaches the target value Iclamp_target.

11. The method of claim 7 wherein continuously reevaluating the maximal current, Imax, comprises:
comparing the current into the clamp, referred to as Iclamp, to a Iclamp low threshold,
when the current into the clamp is lower than Iclamp low threshold, resetting the maximal current, referred to as, Imax to zero and increasing it until the current into the clamp reaches a target value, referred to as, Iclamp_target.

12. The method of claim 7, comprising reducing (S4), by said hardware processor, its power consumption depending on said determined maximal current, referred to as, Imax, in order to prevent a collapse of the power supply.

13. A computer program product directly loadable into the memory of at least one computer, comprising software code instructions for performing the steps below when said product is run on the computer,
for alternating phases of contactless communications with a reader over an electromagnetic field and processor execution and comprising a power supply, a current monitor, a processing system comprising a hardware processor configured for performing operations, a dynamic extra current loader and a clock generator wherein the power supply includes a clamp circuit, and comprising, performed continuously by said contactless electronic system until an end of each execution phase of said hardware processor:

continuously reevaluating during the execution phase of the processor a maximal current Imax provided by the power supply to the processing system from the electromagnetic field by comparing a current into the clamp circuit to at least one predetermined threshold, by said current monitor, comparing the maximal current, referred to as, Imax determined and a current drawn by the processing system, referred to as, Iplatform by said current monitor, when the current drawn by the processing system Iplatform is lower than the determined maximal current, referred to as, Imax, drawing from the power supply in addition to the current drawn by the processing system, Iplatform an extra current, referred to as, Iextra equal to a subtraction operation (Imax−Iplatform), by said dynamic extra current loader, wherein said dynamic extra current loader is an extra current from the power supply in addition to the current drawn by the processing system.

* * * * *